United States Patent [19]
Shaffer

[11] Patent Number: 6,096,823
[45] Date of Patent: Aug. 1, 2000

[54] MOISTURE-CURABLE COMPOUNDS CONTAINING ISOCYANATE AND ALKOXYSILANE GROUPS

[75] Inventor: Myron W. Shaffer, New Cumberland, W. Va.

[73] Assignee: Bayer Corporation, Pittsburgh, Pa.

[21] Appl. No.: 09/172,584

[22] Filed: Oct. 14, 1998

[51] Int. Cl.[7] .............................. C08J 3/00; C08K 3/20; C08L 83/00; C08G 77/04

[52] U.S. Cl. .......................... 524/590; 524/588; 524/589; 528/10; 528/25; 528/28; 528/33; 528/38; 428/447

[58] Field of Search ................................. 528/10, 25, 28, 528/33, 38; 428/447; 524/588, 589, 590

[56] References Cited

U.S. PATENT DOCUMENTS

| | | | |
|---|---|---|---|
| 3,420,800 | 1/1969 | Haggis | 260/75 |
| 3,567,692 | 3/1971 | Haggis | 260/75 |
| 3,905,929 | 9/1975 | Noll | 260/29.2 |
| 3,920,598 | 11/1975 | Rieff et al. | 260/29.2 |
| 4,067,844 | 1/1978 | Barron et al. | 260/37 N |
| 4,190,566 | 2/1980 | Noll et al. | 260/29.2 |
| 4,374,237 | 2/1983 | Berger et al. | 528/28 |
| 4,650,835 | 3/1987 | Eck et al. | 525/440 |
| 4,687,533 | 8/1987 | Rizk et al. | 156/307.3 |
| 5,623,044 | 4/1997 | Chiao | 528/28 |
| 5,852,137 | 12/1998 | Hsieh et al. | 525/458 |

FOREIGN PATENT DOCUMENTS 2002064 7/1971 Germany .

OTHER PUBLICATIONS

Derwent Patent Family Search for BE 761626 A.

*Primary Examiner*—Robert Dawson
*Assistant Examiner*—Jeffrey B. Robertson
*Attorney, Agent, or Firm*—Joseph C. Gil; Thomas W. Roy

[57] ABSTRACT

The present invention relates to moisture-curable compounds which a) have an isocyanate group content (calculated as NCO, MW 42) of 2 to 30% by weight and an alkoxysilane group content (calculated as Si, MW 28) of 0.2 to 4.5% by weight, b) optionally contain repeating ethylene oxide units and c) have an equivalent ratio of isocyanate groups to alkoxy groups of 1.0:0.05 to 1.0:2.5, wherein the preceding percentages are based on the weight of the moisture-curable compounds and wherein the alkoxysilane groups are incorporated as the reaction products of i) a polyisocyanate component having a minimum average functionality of 2.0 and containing at least 50% by weight of polyisocyanate adducts, provided that when the moisture-curable compounds contain ethylene oxide units, the polyisocyanate component has a minimum average functionality of 2.4, and ii) amino compounds containing alkoxysilane groups and corresponding to formula I (I)

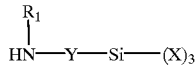

The present invention also relates to coating, adhesive or sealing compositions containing these moisture-curable compounds as the binder.

21 Claims, No Drawings

MOISTURE-CURABLE COMPOUNDS CONTAINING ISOCYANATE AND ALKOXYSILANE GROUPS

BACKGROUND OF THE INVENTION

1. Field of the Invention

The present invention relates to moisture-curable compounds containing isocyanate and alkoxysilane groups, which can be cured in the presence of moisture to form coatings and sealants.

2. Description of the Prior Art

It is known that polyisocyanate resins are curable in the presence of atmospheric moisture to form polyurea coatings. During the curing mechanism an isocyanate group reacts with moisture to form an amino group, which then reacts with another isocyanate group to form a urea group. One of the disadvantages of these moisture-curing resins is that the curing mechanism is relatively slow.

It has been suggested in U.S. Pat. Nos. 3,420,800 and 3,567,692 that the curing rate of moisture-curable polyisocyanates can be increased by incorporating either aldimines or ketimines. It is stated that the reaction of moisture with an aldimine or ketimine to form the corresponding amine is faster than the reaction of moisture with an isocyanate group to form an amine. A disadvantage of the use of aldimines and ketimines to accelerate the cure of polyisocyanates is that it requires the preparation of an additional component and requires some type of metering equipment to ensure that the two components are blended in the proper proportions.

It is an object of the present invention to increase the curing rate of moisture-curable polyisocyanates without the need for a co-reactant.

This object may be achieved with the polyisocyanates of the present invention, which have been modified to contain alkoxysilane groups incorporated through secondary amino groups. The faster curing rates obtained according to the present invention are surprising because alkoxysilane groups, which are also curable in the presence of moisture, cure more slowly than polyisocyanates. However, when both isocyanate groups and alkoxysilane groups are present, a faster curing rate is obtained.

U.S. Pat. Nos. 4,687,533 and 5,623,044 disclose the preparation of compounds containing isocyanate groups and alkoxysilane groups by reacting a portion of the isocyanate groups with amino compounds containing two trialkoxysilane groups. To the contrary the present invention only allows for the presence of such amino compounds when the moisture-curable compounds also contain repeating ethylene oxide units. In addition, these patents failed to recognize the improvement in curing rate that can be obtained with the moisture-curable compounds of the present invention.

U.S. Pat. Nos. 4,067,844 and 4,374,237 disclose the preparation of compounds containing isocyanate groups and alkoxysilane groups by reacting a portion of the isocyanate groups of NCO prepolymers with amino compounds containing alkoxysilane groups. The moisture-curable compounds according to the present invention must prepared from polyisocyanate adducts as opposed to NCO prepolymers.

Copending application, U.S. Ser. No. 09/058,072, discloses water dispersible compounds containing isocyanate and alkoxysilane groups. The water dispersible compounds must be prepared from a polyisocyanate component having a minimum average functionality of 2.4 and be rendered water dispersible by the use of either ionic or nonionic hydrophilic groups.

Copending application, U.S. Ser. No. 08/992,551, discloses the preparation of polyurethane-urea dispersions containing alkoxysilane groups incorporated through secondary amino groups. However, because the resulting polyurethane dispersions are dispersed in water, they do not contain any unreacted isocyanate groups. In addition, the polyurethane dispersions are prepared from monomeric polyisocyanates as opposed to the polyisocyanate adducts required by the subject application.

SUMMARY OF THE INVENTION

The present invention relates to moisture-curable compounds which a) have an isocyanate group content (calculated as NCO, MW 42) of 2 to 30% by weight and an alkoxysilane group content (calculated as Si, MW 28) of 0.2 to 4.5% by weight, b) optionally contain repeating ethylene oxide units and c) have an equivalent ratio of isocyanate groups to alkoxy groups, which are bound to Si, of 1.0:0.05 to 1.0:2.5, wherein the preceding percentages are based on the weight of the moisture-curable compounds and wherein the alkoxysilane groups are incorporated as the reaction products of i) a polyisocyanate component having a minimum average functionality of 2.0 and containing at least 50% by weight of polyisocyanate adducts, provided that when the moisture-curable compounds contain ethylene oxide units, the polyisocyanate component has a minimum average functionality of 2.4, and ii) amino compounds corresponding to formula I

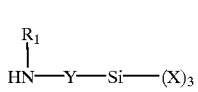
(I)

wherein

X represents identical or different organic groups which are inert to isocyanate groups below 100° C., provided that at least one of these groups is an alkoxy group, Y represents a linear or branched alkylene group having 1 to 8 carbon atoms and $R_1$ represents an organic group other than a succinate group, which is inert to isocyanate groups at a temperature of 100° C. or less, or when the moisture-curable compounds contain repeating ethylene oxide units, $R_1$ may also represent a group corresponding to the formula

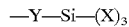
(II)

The present invention also relates to coating, adhesive or sealing compositions containing these moisture-curable compounds as the binder.

DETAILED DESCRIPTION OF THE INVENTION

The compounds according to the present invention are based on the reaction products of polyisocyanates, amino-functional silanes and optionally compounds containing ethylene oxide units and isocyanate-reactive groups, preferably hydroxy groups. The silanes are incorporated in the form of urea groups, while the ethylene oxide groups are generally incorporated in the form of urethane groups.

The moisture-curable compounds have
a) an alkoxysilane group content (calculated as Si, MW 28) of 0.2 to 4.5% by weight, preferably 0.2 to 4% and more preferably 0.5 to 3.5%,
b) an isocyanate group content (calculated as NCO, MW 42) of 2 to 30% by weight, preferably 3 to 25% by weight and more preferably 5 to 20% by weight and
c) optionally an ethylene oxide group content (calculated as $CH_2$—$CH_2$—O, MW 44) of 5 to 35% by weight, preferably 5 to 30% by weight and more preferably 5 to 25% by weight,
wherein the preceding percentages are based on the weight of the moisture-curable compounds.

Suitable compounds containing alkoxysilane groups and amino groups, which may be used to prepare the moisture-curable compounds, include those corresponding to formula I wherein X represents identical or different organic groups which are inert to isocyanate groups below 100° C., provided that at least one of these groups is an alkoxy group, preferably alkyl or alkoxy groups having 1 to 4 carbon atoms and more preferably alkoxy groups, $R_1$ represents an organic group other than a succinate group which is inert to isocyanate groups at a temperature of 100° C. or less, preferably an alkyl, cycloalkyl or aromatic group having 1 to 12, preferably 1 to 8 carbon atoms, or when the moisture-curable compounds according to the invention contain repeating ethylene oxide units, $R_1$ may also represent a group corresponding to the formula

—Y—Si—(X)$_3$     (II)

and n is an integer from 1 to 8, preferably 2 to 4 and more preferably 3.

Especially preferred are compounds in which X represents methoxy, ethoxy groups or propoxy groups, more preferably methoxy or ethoxy groups and most preferably methoxy groups, and n is 3. Examples of suitable aminoalkyl alkoxysilanes of formula I containing secondary amino groups include N-phenylaminopropyl-trimethoxysilane (available as Y-9669 from OSI Specialties, Witco), N-cyclohexylaminopropyltriethoxy-silane, N-methylaminopropyl-trimethoxysilane and the corresponding alkyl diethoxy and alkyl dimethoxy silanes. When the moisture-curable compounds according to the invention also contain repeating ethylene oxide units, bis-(γ-trimethoxysilylpropyl)amine (available as A-1170 from OSI Specialties, Witco) is also a suitable aminoalkyl alkoxysilane.

The polyisocyanate component for preparing the compounds containing isocyanate and alkoxysilane groups has a minimum average functionality of 2.0, preferably 2.4, more preferably 2.6 and most preferably 2.8, and a maximum average functionality of 6 more preferably 5. When ethylene oxide units are present in the moisture-curable resins, the polyisocyanate component has a minimum functionality of 2.4. The polyisocyanate component may contain monomeric diisocyanates or polyisocyanate adducts having functionalities which do not satisfy these requirements, provided that the average functionality of the polyisocyanate component satisfies these requirements.

The polyisocyanate component contains at least 50% by weight, preferably at least 70% by weight, more preferably at least 95% by weight of polyisocyanates adducts containing isocyanurate, uretdione, biuret, urethane, iminooxadiazine dione, allophanate, carbodiimide and/or oxadiazinetrione, preferably isocyanurate, uretdione, biuret, iminooxadiazine dione and/or allophanate groups. In addition to the polyisocyanate adducts the polyisocyanate component may optionally contain either monomeric polyisocyanates or other polyisocyanate adducts. Preferred polyisocyanates are those containing (cyclo)aliphatically-bound isocyanate groups.

Suitable monomeric diisocyanates, which may be present in the polyisocyanate component in the form of monomers or which may be used to prepare the polyisocyanate adducts, are represented by the formula $R(NCO)_2$ wherein R represents an organic group obtained by removing the isocyanate groups from an organic diisocyanate having a molecular weight of about 112 to 1,000, preferably about 140 to 400. Diisocyanates preferred for the process according to the invention are those in which R represents a divalent aliphatic hydrocarbon group having 4 to 40, preferably 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,1 2-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 2,4'-dicyclohexyl-methane diisocyanate, 1,3- and 1,4-bis-(isocyanatomethyl)-cyclohexane, bis-(4-isocyanato-3-methyl-cyclohexyl)-methane, α,α,α',α'-tetramethyl-1,3- and/or -1,4-xylylene diisocyanate, 1-isocyanato-1-methyl-4 (3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenyl-methane diisocyanate, 1,5-diisocyanato naphthalene and mixtures thereof.

Monomeric polyisocyanates containing 3 or more isocyanate groups such as 4-isocyanantomethyl-1,8-octamethylene diisocyanate and aromatic polyisocyanates such as 4,4',4"-triphenylmethane triisocyanate and polyphenyl polymethylene polyisocyanates obtained by phosgenating aniline/formaldehyde condensates may also be present in the polyisocyanate component or used to prepare the polyisocyanate adducts.

Preferred organic diisocyanates include 1,6-hexamethylene diisocyanate, 1-isocyanato-3-isocyanatomethyl-3,5,5-trimethylcyclohexane(isophorone diisocyanate or IPDI), bis-(4-isocyanatocyclohexyl)-methane, 1-isocyanato-1-methyl-4(3)-isocyanatomethyl cyclohexane, 2,4- and/or 2,6-toluylene diisocyanate, and 2,4- and/or 4,4'-diphenyl-methane diisocyanate. More preferred are the preceding diisocyanates containing aliphatically- and/or cycloaliphatically-bound isocyanate groups.

Suitable polyisocyanate adducts, which have an average functionality of 2 to 6 and an NCO content of 2 to 30% by weight, include:

1) Isocyanurate group-containing polyisocyanates which may be prepared as set forth in DE-PS 2,616,416, EP-OS 3,765, EP-OS 10,589, EP-OS 47,452, U.S. Pat. No. 4,288, 586 and U.S. Pat. No. 4,324,879. The isocyanatoisocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a suitable catalyst, e.g., a trialkyl phosphine catalyst, and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, preferably less than 200, such as trimethylol propane, glycerine, 1,2-dihydroxy propane and mixtures thereof. The urethane group-containing polyisocyanates have a most preferred NCO content of 12 to 20% by weight and an (average) NCO functionality of at least 2.4, preferably 2.5 to 3, and an NCO equivalent weight of preferably less than 500, more preferably less than 300.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates which may be prepared in accordance with the processes set forth in U.S. Pat. Nos. 5,124,427, 5,208,334 and 5,235,018, the disclosures of which are herein incorporated by reference, preferably polyisocyanates containing these groups in a ratio of monoisocyanurate groups to mono-allophanate groups of about 10:1 to 1:10, preferably about 5:1 to 1:7.

7) Iminooxadiazine dione and optionally isocyanurate group-containing polyisocyanates which may be prepared in the presence of special fluorine-containing catalysts as described in DE-A 19611849. These polyisocyanates generally have an average NCO functionality of 3 to 3.5 and an NCO content of 5 to 30%, preferably 10 to 25% and most preferably 15 to 25% by weight.

8) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

9) Polyisocyanates containing oxadiazinetrione groups and containing the reaction product of two moles of a diisocyanate and one mole of carbon dioxide.

Preferred polyisocyanate adducts are the polyisocyanates containing isocyanurate groups, uretdione, biuret groups, iminooxadiazine dione and/or allophanate groups.

Suitable compounds containing ethylene oxide units, which may optionally be incorporated into the moisture-curable compounds according to the present invention, include compounds containing lateral or terminal, ethylene oxide units. Suitable compounds for incorporating lateral or terminal, hydrophilic ethylene oxide units are known and disclosed in U.S. Pat. Nos. 3,905,929, 3,920,598 and 4,190,566 (the disclosures of which are herein incorporated by reference). Preferred hydrophilic components are the monohydroxy polyethers having terminal hydrophilic chains containing ethylene oxide units. These hydrophilic components may be produced as described in the preceding patents by alkoxylating a monofunctional starter, such as methanol or n-butanol, using ethylene oxide and optionally another alkylene oxide, for example, propylene oxide.

The moisture-curable compounds according to the invention are prepared by reacting the polyisocyanate monomers and/or adducts with the amino-functional silanes in an amount sufficient such that the moisture-curable compounds contain isocyanate groups and alkoxy groups, which are bound to Si, in an equivalent ratio of 1.0:0.05 to 1.0:2.5, preferably 1.0:0.05 to 1.0:2.2 and more preferably 1.0:0.1 to 1.0:2.0.

The compounds containing repeating ethylene oxide units are reacted with the polyisocyanates in amounts sufficient to provide the amount of ethylene oxide units previously set forth. In one embodiment of the present invention the moisture-curable compounds do not contain sufficient ethylene oxide units to be stably dispersed in water. Compounds which cannot be stably dispersed are those that do not remain mixed with water, either in the form of an oil-in-water emulsion or a water-in-oil emulsion, without settling, coagulation or separation.

The reaction is preferably carried out by incrementally adding the isocyanate-reactive compound to the polyisocyanate. The amino-functional silane and the optional compound containing ethylene oxide groups may be added sequentially or in admixture. When present the compound containing ethylene oxide units is preferably added first, followed by the amino-functional silane.

The compounds according to the invention can also be prepared by mixing different types of compounds, provided that they satisfy the preceding guidelines regarding the amounts hydrophilic groups, alkoxysilane groups and isocyanate groups. For example, compounds which contain alkoxysilane groups, but are free from isocyanate groups, and/or compounds which contain isocyanate groups, but which do not contain alkoxysilane groups, may be present as a portion of the compounds according to the invention.

The reaction to form the urea groups is conducted at a temperature of 10 to 100° C., preferably 20 to 80° C. and more preferably 20 to 50° C., while the reaction with the compounds containing ethylene oxide units is conducted at a temperature of 20 to 150° C., preferably 50 to 120° C. and more preferably 60 to 100° C.

The compounds of the present invention are suitable for use in one-component, coating, adhesive or sealing compositions, which can be cured in the presence of atmospheric moisture. The compositions cure by a multi-cure mechanism, i.e., 1) by the reaction of isocyanate groups with moisture,
2) by "silane polycondensation" from the hydrolysis of alkoxysilane groups to form Si—OH groups and their subsequent reaction with either Si—OH or Si—OR groups to form siloxane groups (Si—O—Si) and
3) conceivably by the reaction of isocyanate groups with Si—OH groups.

Suitable acidic or basis catalysts may be used to promote the curing reaction. Examples include acids such as para-toluene sulfonic acid; metallic salts such as dibutyl tin dilaurate; tertiary amines such as triethylamine or triethylene diamine; and mixtures of these catalysts. Low molecular weight, basic aminoalkyl trialkoxysilanes, such as those represented by formula I, also accelerate hardening of the compounds according to the invention.

The one-component compositions generally have a solids content of 50 to 100%, preferably 80 to 100%, based on the weight of the one-component composition. Suitable organic solvents include those which are known from polyurethane chemistry.

The compositions may also contain known additives, such as leveling agents, wetting agents, flow control agents, antiskinning agents, antifoaming agents, fillers (such as silica, aluminum silicates and high-boiling waxes), viscosity regulators, plasticizers, pigments, dyes, UV absorbers and stabilizers against thermal and oxidative degradation.

The one-component compositions may be applied to any desired substrates, such as wood, plastics, leather, paper, textiles, glass, ceramics, plaster, masonry, metals and concrete. They may be applied by standard methods, such as spray coating, spread coating, flood coating, casting, dip coating, roll coating. The coating compositions may be clear or pigmented lacquers.

The one-component compositions may be cured at ambient temperature, or at elevated temperatures. Preferably, the moisture-curable resins are cured at ambient temperatures.

The invention is further illustrated but is not intended to be limited by the following examples in which all parts and percentages are by weight unless otherwise specified.

EXAMPLES

Polyisocyanate 1

An isocyanurate group-containing polyisocyanate prepared from 1,6-hexamethylene diisocyanate and having an isocyanate content of 21.6%, a content of monomeric diisocyanate of <0.2% and a viscosity at 20° C. of 3000 mPa.s (available from Bayer Corporation as Desmodur N 3300).

Polyisocyanate 2

A water dispersible polyisocyanate having an isocyanate content of 17.3%, an ethylene oxide (EO) content of 15% and an equivalent weight of 243, based on solids (available from Bayer Corporation as Bayhydur XP-7063).

General Procedure for the Preparation of Compounds Containing Isocyanate Groups and Alkoxysilane Groups The polyisocyanate was added to a flask equipped with a stirrer, nitrogen inlet, and a thermocouple. N-phenyl-N-(3-triethoxysilylpropyl) amine(Silquest Y-9669, available from Witco) was added to the polyisocyanate with stirring. After the reaction components were mixed, the contents of the reaction mixture were heated from room temperature to 60° C. for one hour. The reaction mixtures are shown in the following table.

| Ex. | Polyiso. Type/amt. | Amino-silane amt. | Equiv. Ratio of NCO/SiOR * | % NCO | % Si | % EO |
|---|---|---|---|---|---|---|
| 1 | 2/100 | 0 | 100% isocyanate | 17.3 | 0 | 15 |
| 2 | 2/90 | 10 | 1.0:0.35 | 13.0 | 1.1 | 12 |
| 3 | 2/80 | 20 | 1.0:1.0 | 10.1 | 2.2 | 10.7 |
| 4 | 2/70 | 30 | 1.0:2.0 | 7.0 | 3.3 | 9.2 |
| 5 | 2/50 | 52.5 | 100% alkoxysilane | 0 | 5.6 | 6.4 |
| 6 | 1/100 | 0 | 100% | 21.5 | 0 | — |

-continued

| Ex. | Polyiso. Type/amt. | Amino-silane amt. | Equiv. Ratio of NCO/SiOR * | % NCO | % Si | % EO |
|---|---|---|---|---|---|---|
| 7 | 1/90 | 10 | isocyanate 1.0:0.28 | 21.5 | 0 | — |
| 8 | 1/75 | 25 | 1.0:1.0 | 12.1 | 2.74 | — |
| 9 | 1/60 | 40 | 1.0:3.3 | 6.5 | 4.4 | — |
| 10 | 1/50 | 65 | 100% alkoxysilane | 0 | 6.2 | — |

* Equivalent ratio of isocyanate groups to alkoxy groups, which are bound to silicon The products of Examples 1–10 were mixed with a 1:1 blend of n-butylacetate and Aromatic 100 solvent to obtain the solids content set forth in the following table. Dibutyltin dilaurate catalyst was added in an amount of 0.2% by weight, based on resin solids. Coatings were prepared by preparing 3 mil draw downs on glass and curing at room temperature. Dry times were determined with a Gardner Dry Time Meter as described in the Pacific Scientific Instruction Manuals DG-9600 and DG-9300.

| Ex. | NCO/SIOR | Solids Content | Viscosity (mpa · s) | Set to Touch (min) | Set to Dry (min) | Hard Dry (min) | Mar Free (min) |
|---|---|---|---|---|---|---|---|
| 1 (Comp) | 100% isocyanate | 80 | 180 | 50 | 100 | 200 | 285 |
| 2 | 1.0:0.35 | 80 | 220 | 40 | 75 | 105 | 155 |
| 3 | 1.0:1.0 | 80 | 270 | 45 | 90 | 120 | 195 |
| 4 | 1.0:2.0 | 80 | 380 | 45 | 90 | 165 | 210 |
| 5 (Comp) | 100% silane | | 175 | | >720 | >1500 | |
| 6 (Comp) | 100% isocyanate | 80 | 160 | 50 | 110 | 190 | 255 |
| 7 | 1.0:0.28 | 80 | 218 | 30 | 60 | 90 | 135 |
| 8 | 1.0:1.0 | 80 | 340 | 30 | 50 | 90 | 135 |
| 9 | 1.0:3.3 | 80 | 480 | 45 | 160 | 210 | 290 |
| 10 (Comp) | 100% silane | 70 | 185 | | >720 | >1500 | |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A moisture-curable compound which
   a) has an isocyanate group content (calculated as NCO, MW 42) of 2 to 30% by weight and an alkoxysilane group content (calculated as Si, MW 28) of 0.2 to 4.5% by weight,
   b) optionally contains repeating ethylene oxide units and
   c) has an equivalent ratio of isocyanate groups to alkoxy groups, which are bound to Si, of 1.0:0.05 to 1.0:2.5, wherein the preceding percentages are based on the weight of the moisture-curable compound and wherein the alkoxysilane groups are incorporated as the urea group-containing reaction product of
      i) a polyisocyanate component having a minimum average functionality of 2.0 and containing at least 50% by weight of polyisocyanate adducts, provided that when the moisture-curable compound contains ethylene oxide units, the polyisocyanate component has a minimum average functionality of 2.4, and ii) an amino compound corresponding to formula I

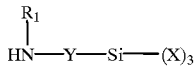 (I)

wherein
X represents identical or different organic groups which are inert to isocyanate groups below 100° C., provided that at least one of these groups is an alkoxy group,
Y represents a linear or branched alkylene group having 1 to 8 carbon atoms and
$R_1$ represents an organic group other than a succinate group, which is inert to isocyanate groups at a temperature of 100° C. or less, or when the moisture-curable compounds contain repeating, lateral or terminal ethylene oxide units, $R_1$ may also represent a group corresponding to the formula

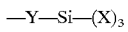 (II).

2. The moisture-curable compound of claim 1 which has an isocyanate group content (calculated as NCO, MW 42) of 3 to 25% by weight and an alkoxysilane group content (calculated as Si, MW 28) of 0.2 to 4% by weight, wherein the preceding percentages are based on the weight of the moisture-curable compound.

3. The moisture-curable compound of claim 1 wherein the alkoxysilane groups are incorporated as the reaction product of a polyisocyanate adduct with said amino compound.

4. The moisture-curable compound of claim 2 wherein the alkoxysilane groups are incorporated as the reaction product of a polyisocyanate adduct with said amino compound.

5. The moisture-curable compound of claim 1 wherein the alkoxysilane groups are incorporated as the reaction product of a polyisocyanate adduct containing (cyclo)aliphatically-bound isocyanate groups with said amino compound.

6. The moisture-curable compound of claim 2 wherein the alkoxysilane groups are incorporated as the reaction product of a polyisocyanate adduct containing (cyclo)aliphatically-bound isocyanate groups with said amino compound.

7. The moisture-curable compound of claim 5 wherein said polyisocyanate adduct contains isocyanurate groups, biuret groups, allophanate groups, iminooxadiazine dione and/or uretdione groups.

8. The moisture-curable compound of claim 6 wherein said polyisocyanate adduct contains isocyanurate groups, biuret groups, allophanate groups, iminooxadiazine dione and/or uretdione groups.

9. The moisture-curable compound of claim 7 wherein said polyisocyanate adduct is prepared from 1,6-hexamethylene diisocyanate.

10. The moisture-curable compound of claim 8 wherein said polyisocyanate adduct is prepared from 1,6-hexamethylene diisocyanate.

11. The moisture-curable compound of claim 1 wherein said moisture-curable compound cannot be stably dispersed in water.

12. The moisture-curable compound of claim 2 wherein said moisture-curable compound cannot be stably dispersed in water.

13. The moisture-curable compound of claim 3 wherein said moisture-curable compound cannot be stably dispersed in water.

14. The moisture-curable compound of claim 4 wherein said moisture-curable compound cannot be stably dispersed in water.

15. The moisture-curable compound of claim 5 wherein said moisture-curable compound cannot be stably dispersed in water.

16. The moisture-curable compound of claim 6 wherein said moisture-curable compound cannot be stably dispersed in water.

17. The moisture-curable compound of claim 7 wherein said moisture-curable compound cannot be stably dispersed in water.

18. The moisture-curable compound of claim 8 wherein said moisture-curable compound cannot be stably dispersed in water.

19. The moisture-curable compound of claim 9 wherein said moisture-curable compound cannot be stably dispersed in water.

20. The moisture-curable compound of claim 10 wherein said moisture-curable compound cannot be stably dispersed in water.

21. A one-component coating, adhesive or sealant composition wherein the binder comprises the moisture-curable compound of claim 1.

* * * * *